(12) United States Patent
Piastra et al.

(10) Patent No.: US 6,277,536 B1
(45) Date of Patent: Aug. 21, 2001

(54) HETEROCYCLIC COMPOUNDS

(75) Inventors: Bruno Piastra, Huningue (FR); Bansi Lal Kaul, Biel-Benken (CH); Jean Christoph Graciet, Huningue (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/431,992

(22) Filed: Nov. 3, 1999

(30) Foreign Application Priority Data

Nov. 6, 1998 (GB) .................................................. 9824314

(51) Int. Cl.$^7$ .............................. G03G 5/00; C09D 11/00; C09B 67/02; C09B 67/00; C07D 471/00
(52) U.S. Cl. ......................... 430/78; 106/31.47; 525/934; 8/524; 8/568; 8/575; 8/579; 8/637.1; 546/47
(58) Field of Search .................................. 546/47; 549/24, 549/231; 8/524, 568, 575, 579, 637.1; 430/78; 106/31.47; 525/934

(56) References Cited

U.S. PATENT DOCUMENTS

| | | | | |
|---|---|---|---|---|
| 3,759,953 | * | 9/1973 | Troster ................................... | 546/47 |
| 3,812,051 | * | 5/1974 | Merkle et al. .......................... | 546/47 |
| 3,888,863 | * | 6/1975 | Troster ................................... | 546/47 |

OTHER PUBLICATIONS

EPO Search Report.

* cited by examiner

*Primary Examiner*—Alan L. Rotman
*Assistant Examiner*—Raymond Covington
(74) *Attorney, Agent, or Firm*—Susan S. Jackson; Scott E. Hanf

(57) ABSTRACT

Compounds of the formula (I)

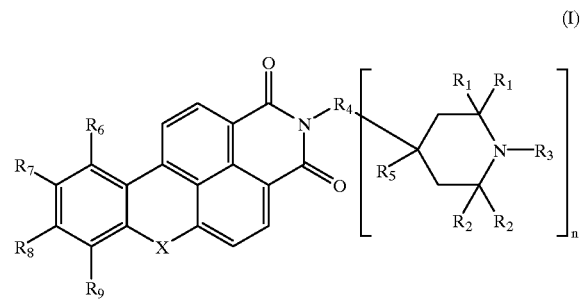

in which the substituents are as defined in claim 1 are valuable colorants for the mass coloring of polymers, with fluorescence property, in electrophotographics toners and developers, in powders coating materials and ink-jet inks.

9 Claims, No Drawings

HETEROCYCLIC COMPOUNDS

The present invention relates to novel colorants for the mass coloring of polymers. In the mass coloring of polar polymers in particular, examples being polyamides, polyesters, polycarbonates and ABS, stringent requirements in terms of their heat stability and light fastness are expected from the dyes used.

The object of the present invention is, therefore, to provide heat-stable, light-fast and readily polymer-soluble colorants, with fluorescence property.

It has been found that the compounds of the formula (I) defined below achieve the stated object.

The invention provides a compound of the formula (I)

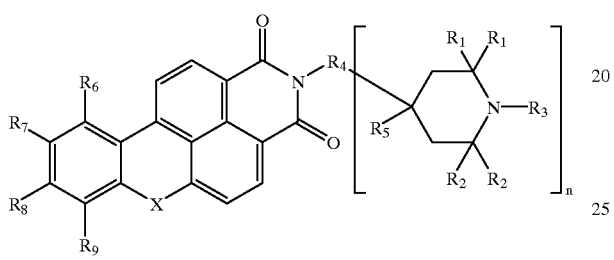

(I)

in which
each $R_1$ independently is —$CH_3$ or —$CH_2(C_{1-4}alkyl)$ or both groups $R_1$ form a group —$(CH_2)_5$—;
each $R_2$ independently is —$CH_3$ or —$CH_2(C_{1-4}alkyl)$ or both groups $R_1$ form a group —$(CH_2)_5$—;
$R_3$ is hydrogen, $C_{1-8}$alkyl, $C_{3-10}$alkenyl, phenyl, phenyl-$C_{1-4}$alkyl or —$COR_{5a}$ where $R_{5a}$ is hydrogen, —$C(R_{10a})$=$CH_2$, $C_{1-6}$alkyl, phenyl, —$COOC_{1-4}$alkyl or —$NR_{21}R_{22}$, where $R_{10a}$ is hydrogen or $C_{1-4}$ alkyl; $R_{21}$ is hydrogen, $C_{1-12}$alkyl, $C_{5-6}$cycloalkyl, phenyl, phenyl$C_{1-4}$alkyl or $C_{1-12}$alkylphenyl and $R_{22}$ is hydrogen or $C_{1-12}$alkyl;
$R_4$ is a direct bond or a bridging group; and
$R_5$ is hydrogen or $C_{1-4}$alkyl; or
$R_4$ and $R_5$ together with the carbon atom to which they are attached form an isocyclic or heterocyclic bridging group;
$R_6$, $R_7$, $R_8$ and $R_9$ are independently hydrogen, halogen, $R_{11}R_{12}N$—, $R_{12}$—O— or $R_{12}$—S—, in which $R_{12}$ is $C_1$–$C_6$-alkyl, $C_6$–$C_{10}$-aryl, $(C_6$–$C_{10})$-aryl-$(C_1$–$C_6)$-alkyl or $(C_1$–$C_6)$-alkyl-$(C_6$–$C_{10})$-aryl, in which the alkyl and/or aryl radicals can be substituted by hydroxyl, $C_1$–$C_6$-alkoxy, $C_6$–$C_{10}$-aryloxy or halogen;
x is sulphur, oxygen or N-$R_{11}$, in which $R_{11}$, is hydrogen, $C_1$–$C_6$-alkyl, $C_6$–$C_{10}$-aryl, $(C_6$–$C_{10})$-aryl-$(C_1$–$C_6)$-alkyl or $(C_1$–$C_6)$-alkyl-$(C_6$–$C_{10})$-aryl, it being possible for the alkyl and/or aryl radicals to be substituted by hydroxyl, $C_1$–$C_6$-alkoxy, $C_6$–$C_{10}$-aryloxy or halogen;
n is an integer from 1 to 4 inclusive.

Preferred compounds of the formula (I) are those in which each $R_1$ and each $R_2$ is methyl.

Compounds of the formula (I) which are also preferred are those in which $R_3$ is hydrogen, methyl, ethyl, $C_{1-4}$alkylcarbonyl or $C_{2-4}$alkenylcarbonyl, more preferably hydrogen.

$R_4$ as a bridging group is preferably —NHCOphenyl—, —NHSO$_2$phenyl- with the phenyl group bonded to the nitrogen atom of the heterocyclic system.

Compounds of the formula (I) which are also preferred are those in which $R_5$ is hydrogen.

Preference is also given to compounds of the formula (I) in which $R_6$ $R_7$, $R_8$, $R_9$ are independently hydrogen, chlorine, bromine, methoxy, ethoxy, phenoxy, —NH—$C_6H_4$—$OCH_3$, —O—$C_6H_4$—$OCH_3$ or —S—$C_6H_4$—$OCH_3$.

X is preferably sulphur and n is preferably 1 or 2.

Particular preference is given to compounds of the formula (I) in which $R_1$ and $R_2$ are methyl and $R_3$ and $R_5$ are hydrogen and R4 is a direct bond.

The present invention also provides a process for preparing the compounds of the formula (I), characterized in that a dicarboxylic acid of the formula (II)

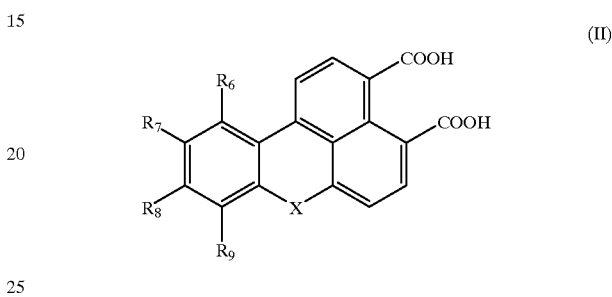

(II)

or, preferably, one of its functional derivatives, e.g. the acid anhydride or acid halide, is condensed with an amine or the salt of an amine of the formula (III)

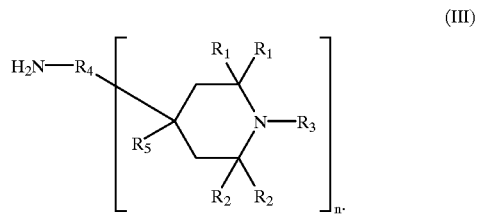

(III)

Examples of suitable salts of the amine of the formula (III) are the chlorohydrate or the sulphate.

Condensation takes place in a molar ratio of (II):(III) of from 1:3 to 3:1.

Condensation can be conducted without solvent in the melt at temperatures, for instance, of between 150° C. and 300° C., preferably up to 250° C., or in an inert solvent at temperatures between 25° C. and 300° C., preferably between 100° C. and 250° C., in the presence or absence of a catalyst, at atmospheric pressure or under pressure.

Examples of suitable solvents are relatively high-boiling aliphatic or aromatic, substituted or unsubstituted hydrocarbons, examples being xylene (mixture), biphenyl, nitrobenzene, chlorobenzenes, chloronaphthalene, glycol ethers, organic acids and acid amides, especially dimethylformamide, dimethylacetamide or N-methylpyrrolidone. If the dicarboxylic acid of the formula (II) is employed in the form of the free acid it is also possible to use water or a relatively high-boiling alcohol, such as ethylene glycol, as solvent.

Examples of possible catalysts are inorganic or organic acids, such as hydrochloric or sulphuric acid, benzenesulphonic, toluenesulphonic acid, or acetic acid. The salts of organic acids, such as sodium or potassium acetate, are in many cases also suitable as catalysts.

The compounds of the invention are eminently suitable for the coloring of melts of synthetic polar polymers such as, for example, ABS, polyester, polycarbonate or polyamides.

Polyamides are, for example, polycondensation products or addition polymerization products of dicarboxylic acids and diamines, e.g. of adipic acid and hexamethylenediamine, of lactams, e.g. ε-caprolactam, or of aminocarboxylic acids, e.g. ω-aminoundecanoic acid. The polyamide melt mixed with the pigment is brought into its final form by conventional methods—for example, in melt spinning, injection molding, extrusion or film blowing machines.

Some of the novel dyes of formula (I) give a fluorescent coloration in synthetic polar polymers such as, for example, ABS, polyester, polycarbonate or polyamides.

The novel dyes of the formula (I) are extremely stable to the heat stress which is necessarily part of the coloring of synthetic polyamides, and the substrates mass-colored with them also display excellent fastness properties, especially light fastness. Their high polymer-solubility is particularly noteworthy.

The novel compounds of the formula (I) are also suitable as colorants in electrophotographic toners and developers, such as one- or two-component powder toners (also called one- or two-component developers), magnetic toners, liquid toners, polymerization toners and specialty toners (literature: L. B. Schein, "Electrophotography and Development Physics", Springer Series in Electrophysics 14, Springer Verlag, $2^{nd}$ Edition, 1992).

Typical toner binders are addition polymerization, polyaddition and polycondensation resins, such as styrene, styrene-acrylate, styrene-butadiene, acrylate, polyester and phenol-epoxy resins, polysulphones, polyurethanes, individually or in combination, and also polyethylene and polypropylene, which may comprise further constituents, such as charge control agents, waxes or flow assistants, or may be modified subsequently with these additives.

The novel compounds of the formula (I) are suitable, furthermore, as colorants in powders and powder coating materials, especially in triboelectrically or electrokinetically sprayable powder coating materials which are used for the surface coating of articles made, for example, from metal, wood, plastic, glass, ceramic, concrete, textile material, paper or rubber (J. F. Hughes, "Electrostatics Powder Coating" Research Studies, John Wiley & Sons, 1984).

Powder coating resins that are typically employed are epoxy resins, carboxyl- and hydroxyl-containing polyester resins, polyurethane resins and acrylic resins, together with customary hardeners. Combinations of resins are also used. For example, epoxy resins are frequently employed in combination with carboxyl- and hydroxyl-containing polyester resins. Typical hardener components (as a function of the resin system) are, for example, acid anhydrides, imidazoles and also dicyanodiamide and its derivatives, blocked isocyanates, bisacylurethanes, phenolic and melamine resins, triglycidyl isocyanurates, oxazolines and dicarboxylic acids.

In addition, the novel compounds of the formula (I) are suitable as colorants in ink-jet inks, both aqueous and non-aqueous, and in those inks which operate in accordance with the hot-melt process.

In the examples below, parts are by weight.

EXAMPLE 1

30.4 parts of benzo[k,l]thioxanthene-3,4-dicarboxylic anhydride are suspended in 170 parts of N,N-dimethylacetamide. 17.2 parts of 4-amino-2,2,6,6-tetramethylpiperidine and 0.3 parts of para-toluenesulfonic acid are then added to the suspension, and then heated at 140° C. for 6 hours. The suspension is then cooled to 100° C. and filtered. The cake is washed with hot dimethylacetamide, warm water and dried. This gives 24.7 parts of an orange-colored powder.

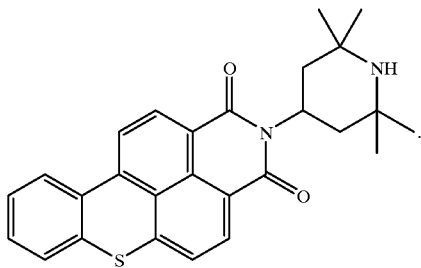

When applied in PA-6, this compound gives a very bright yellow fluorescent transparent color.

EXAMPLE 2

10 parts of 9-chloro-benzo[k,l]thioxanthene-3,4-dicarboxylic anhydride are suspended in 80 parts of N,N-dimethylacetamide. 14 parts of 4-amino-2,2,6,6-tetramethylpiperidine and 0.5 parts of para-toluenesulfonic acid are then added to the suspension, and then heated at reflux for 24 hours. The suspension is then cooled to 25° C. and filtered. The cake is washed with dimethylacetamide, alcohol and dried. This gives 10 parts of an orange-colored powder.

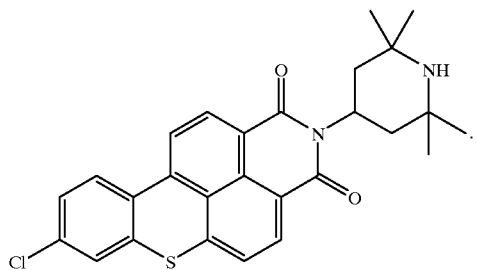

EXAMPLE 3

16.7 parts of benzo[k,l]thioxanthene-3,4 dicarboxylic anhydride are suspended in 150 parts of N,N-dimethylacetamide. 15.15 parts of the following amine

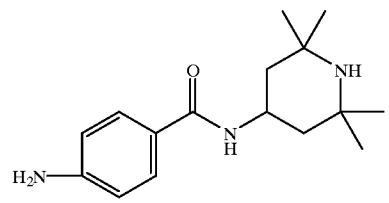

and 0.1 parts of para-toluenesulfonic acid are then added to the suspension, and then heated at reflux for 24 hours. The suspension is then cooled to 25° C. and filtered. The cake is washed with dimethylacetamide, alcohol and dried. This gives 22.8 parts of an orange-colored powder.

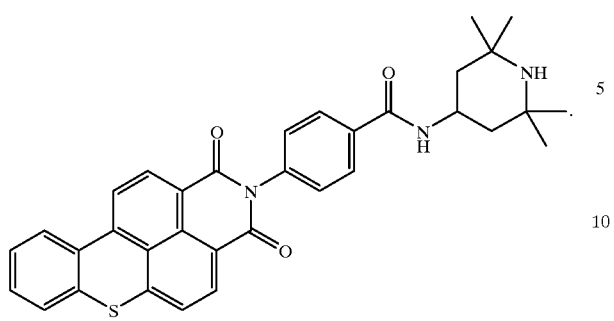

The dyes listed in Table 1 below are prepared in analogy to Example 3.

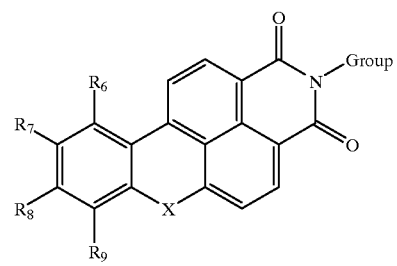

TABLE 1

| Ex. No. | X | $R_6$ | $R_7$ | $R_8$ | $R_9$ | Group | Shade in nylon 6.6 |
|---|---|---|---|---|---|---|---|
| 4 | S | H | H | $CH_3$ | H | ![tetramethylpiperidine-NH] | Yellow |
| 5 | S | H | H | $OCH_3$ | H | ditto | Yellow |
| 6 | S | H | H | $CF_3$ | H | ditto | Yellow |
| 7 | O | H | H | H | H | ditto | Yellow |
| 8 | O | H | H | Cl | H | ditto | Yellow |
| 9 | NEthyl | H | H | H | H | ditto | Orange |
| 10 | S | H | H | Cl | H | ![phenyl-COTAD] | Yellow |
| 11 | S | H | H | H | H | ![phenyl-(COTAD)$_2$] | Yellow |
| 12 | S | H | H | H | H | ![tetramethylpiperidine-N-CH$_3$] | Yellow |
| 13 | S | H | H | H | H | ![tetramethylpiperidine-N-COCH$_3$] | Yellow |

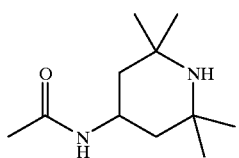

where -COTAD means:

USE EXAMPLE 100 parts of polycaprolactam in the form of a powder are mixed with 0.1 and with 1.0 part respectively of the dye from Example 1 in powder form in a drum mixer. After a short time, the powder is uniformly distributed and adheres to the granules. After about 10 minutes, the mixture is dried at 120° C. for 16 hours, transferred to a melt spinning machine and following a residence time of about 8 minutes is spun to fibers at 275–280° C. under a nitrogen atmosphere. The yellow-colored fibers are extremely lightfast.

All other known synthetic polyamides (nylon, Perlon, etc.) can be mass-colored in the same way, as can polyesters, ABS and polycarbonates, using the compounds of examples 1 to 13.

APPLICATION EXAMPLE

Polyester fibers containing 0.5% (w/w) of the colorant described in the example 1 have been prepared and compared against polyester fibers containing 0.5% (w/w) of the S.Y. 98 having the formula

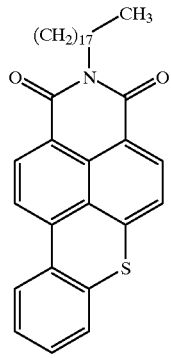

according to the following method:

The polyester is fused and extruded through a drawing plate at constant rate by gears pump regulation. The spinning machine is heated during 2 hours at temperatures of 260° C., 262° C., 262° C., 265° C. and 265° C. under pressure of 80 bars. The drawing plate is heated in an oven at 350° C. for at least 30 minutes. The obtained fibers are recovered on a bobbin. The fibers colored with our product give a bright fluorescent yellow color with 15% higher color strength compared to S.Y. 98. Light and weather fastness are excellent.

What is claimed is:

1. Compound of the formula (I)

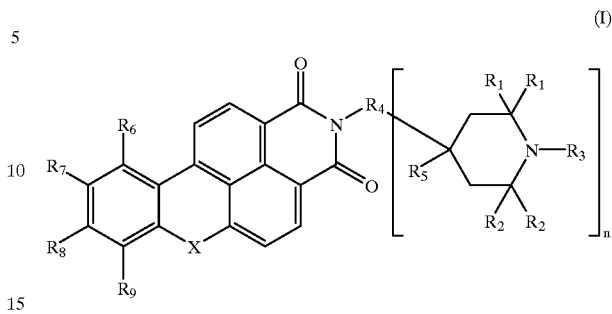

in which each $R_1$ independently is —$CH_3$ or —$CH_2(C_{1-4}alkyl)$ or both groups $R_1$ form a group —$(CH_2)_5$—;

each $R_2$ independently is —$CH_3$ or —$CH_2(C_{1-4}alkyl)$ or both groups $R_1$ form a group —$(CH_2)_5$—;

$R_3$ is hydrogen, $C_{1-8}$alkyl, $C_{3-10}$alkenyl, phenyl, phenyl-$C_{1-4}$alkyl or —$COR_{5a}$ where $R_{5a}$ is hydrogen, —$C(R_{10a})$=$CH_2$, $C_{1-6}$alkyl, phenyl, —$COOC_{1-4}$ alkyl or —$NR_{21}R_{22}$, where $R_{10a}$ is hydrogen or $C_{1-4}$alkyl; $R_{21}$ is hydrogen, $C_{1-12}$alkyl, $C_{5-6}$cycloalkyl, phenyl, phenyl-$C_{1-4}$alkyl or $C_{1-12}$alkylphenyl and $R_{22}$ is hydrogen or $C_{1-12}$alkyl;

$R_4$ is a direct bond or a bridging group; and $R_5$ is hydrogen or $C_{1-4}$alkyl; or $R_4$ and $R_5$ together with the carbon atom to which they are attached form an isocyclic or heterocyclic bridging group;

$R_6$, $R_7$, $R_8$ and $R_9$ are independently hydrogen, halogen, or $R_{11}R_{12}N$—, or $R_{12}$—O— or $R_{12}$—S—, in which $R_{12}$ is $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can be substituted by hydroxyl, $C_1$–$C_6$-alkoxy, $C_6$–$C_{10}$-aryloxy or halogen.

X is sulphur, oxygen or N—$R_{11}$, in which $R_{11}$, is hydrogen, $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, it being possible for the alkyl and/or aryl radicals to be substituted by hydroxyl, $C_1$–$C_6$-alkoxy, $C_6$–$C_{10}$-aryloxy or halogen;

n is an integer from 1 to 4 inclusive.

2. Compound according to claim 1, characterized in that $R_1$ and $R_2$ are methyl.

3. Compound according to claim 1, characterized in that $R_4$ is a direct bond.

4. Compound according to claim 1, characterized in that $R_5$ and $R_3$ are hydrogen.

5. Compound according to claim 1, characterized in that $R_6$, $R_7$, $R_8$ and $R_9$ are independently hydrogen, chlorine, bromine, methoxy, ethoxy, phenoxy, —NH—$C_6H_4$—$OCH_3$, —O—$C_6H_4$—$OCH_3$ or —S—$C_6H_4$—$OCH_3$.

6. Process for preparing a compound according to claim 1, characterized in that a dicarboxylic acid of the formula (II)

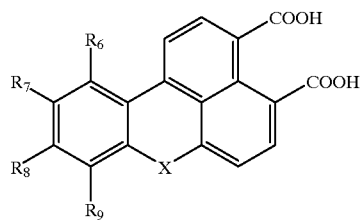

or one of its functional derivatives is condensed with an amine or the salt of an amine of the formula (III)

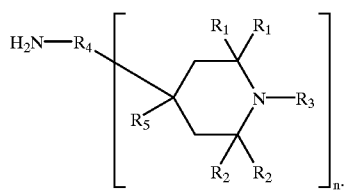

7. Process according to claim 6, characterized in that the functional derivative of the dicarboxylic acid is the acid anhydride or acid chloride.

8. A method of using a compound according to claim 1, comprising incorporating said compound as a colorant in synthetic polyamide, polyester, ABS or polycarbonate, in an electrographic toner, in an electrophotographic developer, in a powder coating material or in an ink-jet ink.

9. The method of using according to claim 8, wherein said compound is incorporated for mass-coloring polycondensates of dicarboxylic acids and diamines, of lactams or of aminocarboxylic acids.

* * * * *